United States Patent
Wang

(10) Patent No.: US 10,210,103 B2
(45) Date of Patent: Feb. 19, 2019

(54) METHOD AND DEVICE FOR CHECKING VALIDITY OF MEMORY ACCESS

(71) Applicant: ZTE CORPORATION, Shenzhen, Guangdong Province (CN)

(72) Inventor: Shilong Wang, Shenzhen (CN)

(73) Assignee: XI'AN ZHONGXING NEW SOFTWARE CO. LTD., Xi'an (CN)

(*) Notice: Subject to any disclaimer, the term of this patent is extended or adjusted under 35 U.S.C. 154(b) by 2 days.

(21) Appl. No.: 15/502,190

(22) PCT Filed: Oct. 23, 2014

(86) PCT No.: PCT/CN2014/089325
§ 371 (c)(1),
(2) Date: Feb. 6, 2017

(87) PCT Pub. No.: WO2015/154431
PCT Pub. Date: Oct. 15, 2015

(65) Prior Publication Data
US 2017/0235684 A1    Aug. 17, 2017

(30) Foreign Application Priority Data
Aug. 8, 2014 (CN) .......................... 2014 1 0390874

(51) Int. Cl.
*G06F 12/08* (2016.01)
*G06F 12/14* (2006.01)
(Continued)

(52) U.S. Cl.
CPC ........ *G06F 12/1458* (2013.01); *G06F 3/0604* (2013.01); *G06F 3/0622* (2013.01);
(Continued)

(58) Field of Classification Search
CPC .. G06F 12/1458; G06F 3/0604; G06F 3/0632; G06F 3/0622; G06F 3/0637;
(Continued)

(56) References Cited

U.S. PATENT DOCUMENTS 4,731,740 A * 3/1988 Eguchi ................ G06F 12/1036
711/207
5,581,697 A * 12/1996 Gramlich ............ G06F 11/3644
714/35

(Continued)

FOREIGN PATENT DOCUMENTS

| CN | 1469254 | 1/2004 |
|---|---|---|
| CN | 101561775 | 10/2009 |
| CN | 102650959 | 8/2012 |

OTHER PUBLICATIONS

International Search Report, International application No. PCT/CN2014/089325, dated May 6, 2015.
(Continued)

*Primary Examiner* — Hiep T Nguyen

(57) ABSTRACT

A method and device for checking validity of memory access are provided. A cache is established and initialization is performed; a total cache position index is calculated; when a program performs memory access, a graded cache unit is addressed according to the total cache position index, and it is determined whether address information of the memory block is able to be read from the graded cache unit; when the address information is able to be read, it is determined whether an instrumentation-based memory checking tool is needed for checking the validity of the current memory access; when the address information is not able to be read, the validity of the current memory access is checked by an instrumentation-based memory checking tool, and the address information of the memory block is
(Continued)

filled into the graded cache unit when the current memory access is determined to be valid.

20 Claims, 3 Drawing Sheets

(51) Int. Cl.
*G06F 12/0802* (2016.01)
*G06F 3/06* (2006.01)

(52) U.S. Cl.
CPC .......... *G06F 3/0632* (2013.01); *G06F 3/0637* (2013.01); *G06F 3/0673* (2013.01); *G06F 12/0802* (2013.01); *G06F 12/1441* (2013.01); *G06F 2212/1016* (2013.01); *G06F 2212/1052* (2013.01)

(58) Field of Classification Search
CPC ........... G06F 3/0673; G06F 2212/1052; G06F 12/0802; G06F 12/1441; G06F 2212/1016
See application file for complete search history.

(56) References Cited

U.S. PATENT DOCUMENTS

| | | | | |
|---|---|---|---|---|
| 5,604,864 | A | * | 2/1997 | Noda .................... G06F 12/145 711/100 |
| 5,761,729 | A | * | 6/1998 | Scales ................. G06F 12/0817 711/148 |
| 2003/0084254 | A1 | * | 5/2003 | Kimura ............... G06F 12/1045 711/144 |
| 2006/0174059 | A1 | | 8/2006 | Granston et al. |
| 2008/0184016 | A1 | | 7/2008 | Erlingsson |
| 2008/0222224 | A1 | * | 9/2008 | Rangarajan .......... G06F 11/366 |
| 2008/0244533 | A1 | | 10/2008 | Berg |
| 2010/0146220 | A1 | | 6/2010 | Panchenko |
| 2013/0246755 | A1 | | 9/2013 | Farrell |

OTHER PUBLICATIONS

European Search Report for Application No. EP 14888936.3: PCT/CN2014/089325 dated Jul. 17, 2017.

* cited by examiner

METHOD AND DEVICE FOR CHECKING VALIDITY OF MEMORY ACCESS

TECHNICAL FIELD

The present disclosure relates to the field of computer programs, and in particular to a method and device for checking validity of memory access.

BACKGROUND

Memory access violation, including array overflow or overrun, illegal pointer operation and free of address information of wrong memory block etc., is one of most easily occurred, most harmful, and most difficult problems in the software development process.

At present, commonly used tools for checking the validity of memory access based on a C/C++ environment mainly include an instrumentation-based memory checking tool and a dynamic binary analysis tool.

The checking method of the instrumentation-based memory checking tool includes: when compiling a C/C++ source document, inserting monitoring function instrumentation at memory allocation and access points, and identifying whether the current memory access is valid according to address information of a memory block to be accessed and the range of the current access.

When checking the memory access of large-scale software, massive memory information, mutually exclusive global resource and data of maintenance tools are required to be searched by the instrumentation-based memory checking tool, therefore, the checking performance of the validity of memory access is very low. The memory access of common software is very frequent, and the performance of the program is greatly affected in validity checking of each access, which makes it impossible for the instrumentation-based memory checking tool to be applied to commercial grade software.

SUMMARY

Based on above description, taking into consideration the fact that the checking performance of the instrumentation-based memory checking tool is low and most of the memory access in common software is valid, embodiments of the present disclosure propose a method for checking validity of memory access, so as to solve the technical problem of low performance, which is existed in the related art of checking the validity of memory access through the instrumentation-based memory checking tool in each memory access.

An embodiment of the present disclosure provides a method for checking validity of memory access, including:

establishing a cache and performing initialization;

calculating a total cache position index according to a size and address of a memory block to be checked;

when a program performs memory access, addressing a graded cache unit according to the total cache position index, and determining whether the address information of the memory block is able to be read from the graded cache unit;

when the address information of the memory block is able to be read from the graded cache unit, determining, according to a range of the current memory access, whether an instrumentation-based memory checking tool is needed for checking the validity of the current memory access;

when the address information of the memory block is not able to be read from the graded cache unit, checking the validity of the current memory access by an instrumentation-based memory checking tool, and filling the address information of the memory block into the graded cache unit when the current memory access is determined to be valid.

Calculating the total cache position index according to the size and address of the memory block to be checked includes:

selecting a cache grade according to the size of the memory block;

calculating a corresponding grade position index of the memory block in the current cache grade according to the address information of the memory block to be checked; and adding the grade position index and an initial position of the current cache grade so as to obtain the total cache position index.

Determining, according to the range of the current memory access, whether an instrumentation-based memory checking tool is needed for checking the validity of the current memory access includes:

when an actual access range is in a range defined by the address information, determining that the current memory access is valid, and continuing running the checked program;

when the actual access range exceeds the range defined by the address information, not determining that the current memory access is valid, and checking the validity of the current memory access by the instrumentation-based memory checking tool.

The method may further include:

clearing memory information in the graded cache unit when the memory block is freed.

Another embodiment of the present disclosure provides a device for checking validity of memory access, including:

a graded cache establishing module, arranged to establish a cache and perform initialization;

a cache index calculating module, arranged to calculate a total cache position index according to a size and address of a memory block to be checked;

an address information reading module, arranged to, when a program performs memory access, address a graded cache unit according to the total cache position index, and determine whether the address information of the memory block is able to be read from the graded cache unit;

a first validity determining module, arranged to determine, according to a range of the current memory access, whether an instrumentation-based memory checking tool is needed for checking the validity of the current memory access, when the address information of the memory block is able to be read from the graded cache unit;

a second validity determining module, arranged to check the validity of the current memory access by an instrumentation-based memory checking tool, when the address information of the memory block is unable to be read from the graded cache unit; and an address information writing module, arranged to fill the address information of the memory block into the graded cache unit, when the current memory access is determined to be valid by the instrumentation-based memory checking tool.

The cache index calculating module is arranged to:

select a cache grade according to the size of the memory block;

calculate a corresponding grade position index of the memory block in the current cache grade according to the address information of the memory block to be checked; and add the grade position index and an initial position of the current cache grade so as to obtain the total cache position index.

The first validity determining module is arranged to:

when an actual access range is in a range defined by the address information, determine that the current memory access is valid, and continue running the checked program;

when the actual access range exceeds the range defined by the address information, not determine that the current memory access is valid, and trigger the second validity determining module to work.

The device may further include:

a cache clearing module, arranged to clear memory information in the graded cache unit when the memory block is freed.

The embodiments of the present disclosure take the advantages of a locality principle of a program. When the first access to a certain segment of memory is checked to be valid, memory address information of the memory is cached, and the memory address information is read directly from the cache in subsequent access to this segment of memory, thereby the validity of the memory access can be checked rapidly, avoiding the problem, existed in the memory access validity checking technology of the related art, of checking the validity through the instrumentation-based memory checking tool every time when accessing a memory, improving the efficiency of checking the validity of memory access and improving the software performance.

The implementation of the objective, functional characteristics and advantages of the present disclosure are further described below with reference to the embodiments and drawings.

DETAILED DESCRIPTION OF THE EMBODIMENTS

Certainly, the embodiments described here are only used for describing the present disclosure, and not limiting the present disclosure.

Figure 1:
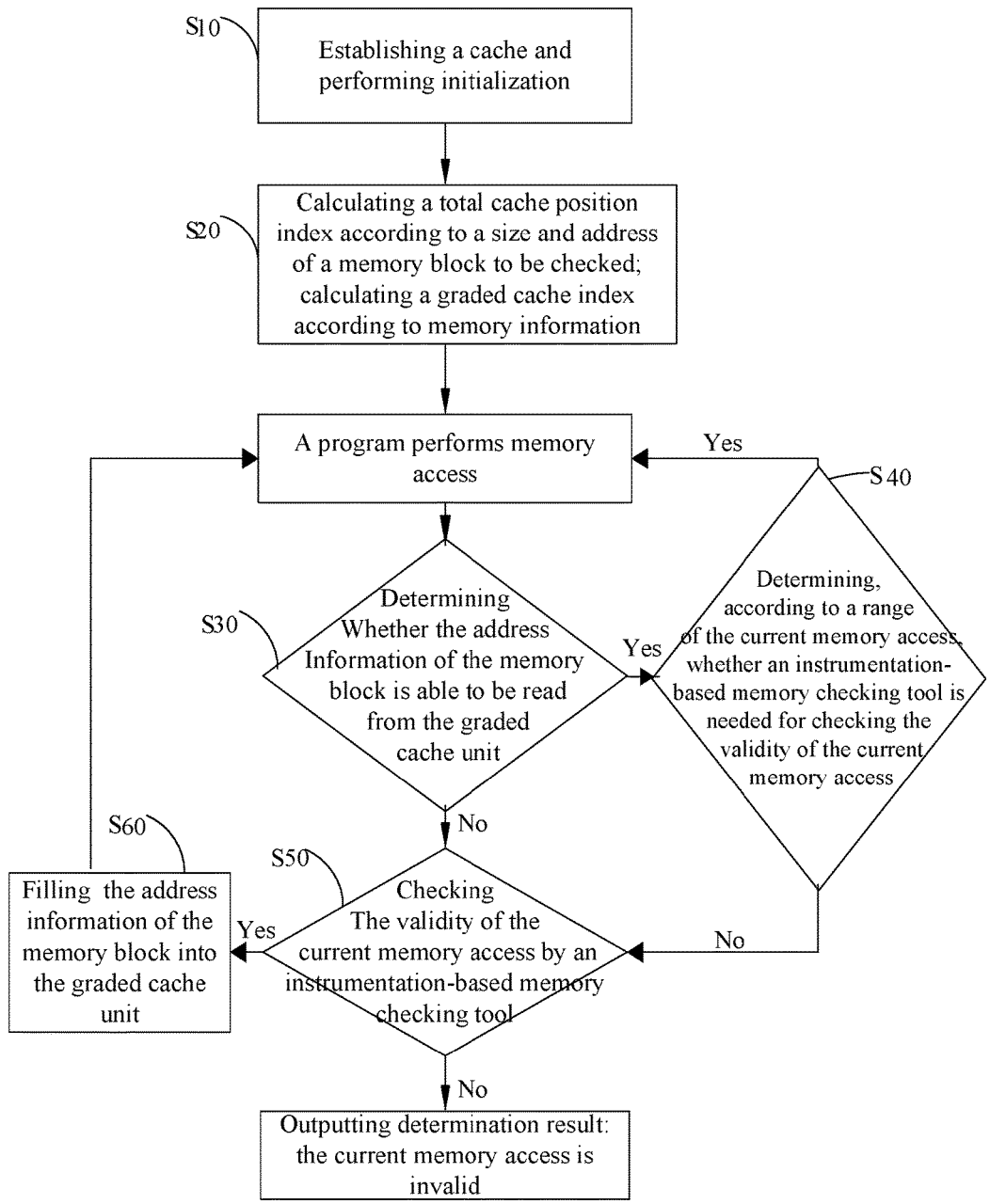
FIG. 1 shows a flowchart of a method for checking validity of memory access in an exemplary embodiment of the present disclosure.

An embodiment of the present disclosure provides a method for checking validity of memory access. As shown in FIG. 1, in this embodiment of the present disclosure, the method for checking validity of memory access at least includes steps as follows.

S10, a cache is established and initialization is performed. For example, according to statistical data of memory use conditions of common software, 7 grades of cache are established, each grade caching 65536 units. The 7 grades of cache correspond to memory blocks with the size of 1-8, 9-128, 129-1K, 1K-8K, 8K-64K, 64K-1M and above 1M respectively.

S20, a total cache position index is calculated according to a size and address of a memory block to be checked. The graded cache index is calculated according to memory information. For example, a cache grade is selected according to the size of the memory block, in an exemplary embodiment, the memory block with the size smaller than or equal to 8 bytes belongs to the cache of the first grade, the memory block with the size larger than 8 bytes and smaller than 128 bytes belongs to the cache of the second grade . . . and so on. The address of the memory to be checked is then right-shifted by a number of bits and then subject to a logical AND operation with 0XFFFF, the obtained value is the graded index. The number of right-shifted bits is related to the cache grade. In the exemplary embodiment, the numbers of right-shifted bits corresponding to the first grade to the seventh grade are respectively 3, 7, 10, 13, 16, and 20. Finally, the graded index and an initial position of the current cache grade are added so as to obtain the total cache position index. The total cache position index points to a certain cache unit in the cache.

S30, when a program performs memory access, a graded cache unit is addressed according to the total cache position index, and it is determined whether the address information of the memory block is able to be read from the graded cache unit; when the address information of the memory block is able to be read from the graded cache unit, the step S40 is performed, when the address information of the memory block is not able to be read from the graded cache unit, the step S50 is performed.

S40, it is determined, according to a range of the current memory access, whether an instrumentation-based memory checking tool is needed for checking the validity of the current memory access.

S50, the validity of the current memory access is checked by an instrumentation-based memory checking tool, and the address information of the memory block is filled into the graded cache unit when the current memory access is determined to be valid.

In the embodiment of the present disclosure, the address information of the memory block refers to an initial address and an ending address of the memory block to be accessed. When a program accesses a memory for the first time, the address information of the memory block is not stored in the cache unit, therefore the read result is empty. In such a case, whether the current memory access is valid (such as whether the array overflows or overruns) is determined by conventional means (such as the instrumentation-based memory checking tool). When the current memory access is determined to be valid by the instrumentation-based memory checking tool, the address information of the memory block is filled into the graded cache unit. In the second or subsequent access of the program, the validity of the current memory access can be checked rapidly based on the range of the current memory access according to the address information of the memory block read from the graded cache units.

The embodiment of the present disclosure takes the advantages of the locality principle of a program. When the first access to a certain segment of memory is checked to be valid, memory address information of the memory is cached, and the memory address information is read directly from the cache in subsequent access to this segment of memory, thereby the validity of the memory access can be checked rapidly, avoiding the problem, existed in the memory access validity checking technology of the related art, of checking the validity through the instrumentation-based memory checking tool every time when accessing a memory, improving the efficiency of checking the validity of memory access and improving the software performance.

Figure 2:
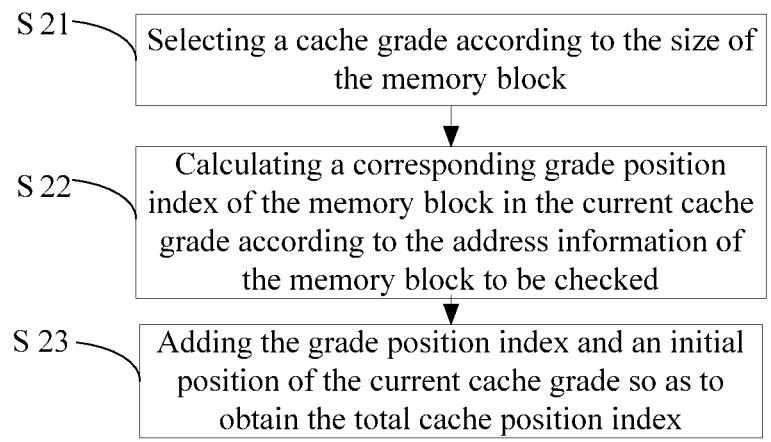
FIG. 2 shows a flowchart of calculating a total cache position index according to a size and address of a memory block to be checked in an exemplary embodiment of the present disclosure.

In an embodiment of the present disclosure, as shown in FIG. 2, the step S20 includes:

S21, a cache grade is selected according to the size of the memory block. For example, the cache grade is selected according to the size of the memory block in the following manner: the memory block with the size smaller than or equal to 8 bytes belongs to the cache of the first grade, the memory block with the size larger than 8 bytes and smaller than 128 bytes belongs to the cache of the second grade . . . and so on.

S22, a corresponding grade position index of the memory block in the current cache grade is calculated according to the address information of the memory block to be checked. For example, the address of the memory to be detected is right-shifted by a number of bits and then subject to a logical AND operation with 0XFFFF, the obtained value is the graded index. The number of right-shifted bits is related to the cache grade, and the numbers of right-shifted bits corresponding to the first grade to the seventh grade are respectively 3, 7, 10, 13, 16, and 20 in the exemplary embodiment.

S23, the grade position index and an initial position of the current cache grade are added together so as to obtain the total cache position index. For example, the graded index and the initial position of the current cache grade are added so as to obtain the total cache position index. The total cache position index points to a certain cache unit in the cache.

In an embodiment of the present disclosure, the step S40 includes:

when an actual access range is in a range defined by the address information, it is determined that the current memory access is valid, and continue running the checked program;

when the actual access range exceeds the range defined by the address information, it is not determined that the current memory access is valid, and the step S50 is performed.

As previously mentioned, the address information of the memory block refers to the initial address and the ending address of the memory block to be accessed, and the initial address and the ending address define the access range. When an actual access range is in a range defined by the address information, the access does not causes overrun, thus the current memory access is checked to be valid, and the instrumentation-based memory checking tool is not needed for checking, continue running the checked program. When the actual access range exceeds the range defined by the address information, the access causes overrun, thus the access is checked to be invalid, and the instrumentation-based memory checking tool is needed for checking the validity of the current memory access.

When the memory block is freed, in order to avoid the problem of wrong addressing of the address information cached in the cache unit in the former validity checking process, in embodiment of the present disclosure, the method may further include the following step.

When the memory block is freed, memory information in the graded cache unit is cleared. When the memory block is freed, an initial address of the memory information cached in the corresponding cache unit is set to be a maximum address value, and the ending address of the memory information cached in the corresponding cache unit is set to be 0.

Figure 3:
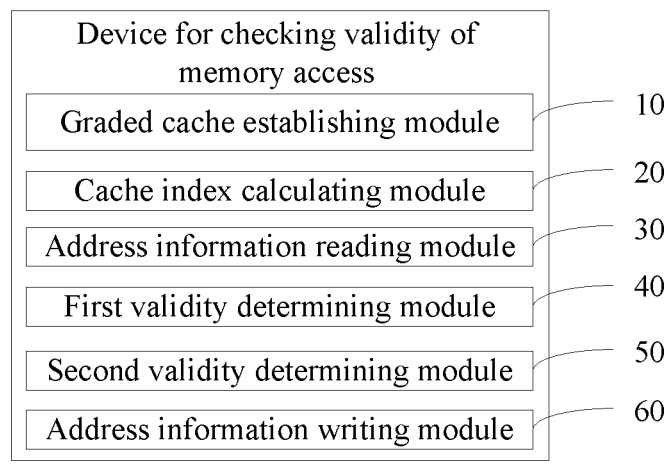
FIG. 3 shows a structural diagram of a device for checking validity of memory access in an exemplary embodiment of the present disclosure.

Another embodiment of the present disclosure further provides a device for checking validity of memory access, arranged to realize the above method. As shown in FIG. 3, in embodiment of the present disclosure, the device for checking validity of memory access includes the following modules.

A graded cache establishing module 10 is arranged to establish a cache and perform initialization. For example, according to statistical data of memory use conditions of common software, 7 grades of cache are established by the graded cache establishing module 10, each grade caching 65536 units. The 7 grades of cache correspond to memory blocks with the size of 1-8, 9-128, 129-1K, 1K-8K, 8K-64K, 64K-1M and above 1M respectively.

A cache index calculating module 20 is arranged to calculate a total cache position index according to a size and address of a memory block to be checked. For example, a cache grade is selected by the cache index calculating module 20 according to the size of the memory block, in the exemplary embodiment, the memory block with the size smaller than or equal to 8 bytes belongs to the cache of the first grade, the memory block with the size larger than 8 bytes and smaller than 128 bytes belongs to the cache of the second grade . . . and so on. The address of the memory to be detected is then right-shifted by a number of bits and then subject to a logical AND operation with 0XFFFF, the obtained value is the graded index. The number of right-shifted bits is related to the cache grade. In the exemplary embodiment, the numbers of right-shifted bits corresponding to the first grade to the seventh grade are respectively 3, 7, 10, 13, 16, and 20. Finally, the graded index and an initial position of the current cache grade are added so as to obtain the total cache position index. The total cache position index points to a certain cache unit in the cache.

An address information reading module 30 is arranged to, when a program performs memory access, address a graded cache unit according to the total cache position index, and determine whether the address information of the memory block is able to be read from the graded cache unit.

A first validity determining module 40 is arranged to, when the address information of the memory block is able to be read from the graded cache unit, determine, according to a range of the current memory access, whether an instrumentation-based memory checking tool is needed for checking the validity of the current memory access.

A second validity determining module 50 is arranged to, when the address information of the memory block is unable to be read from the graded cache unit, check the validity of the current memory access by an instrumentation-based memory checking tool.

An address information writing module 60 is arranged to, when the current memory access is determined to be valid by the instrumentation-based memory checking tool, fill the address information of the memory block into the graded cache unit.

In the embodiment of the present disclosure, the address information of the memory block refers to the initial address and the ending address of the memory block to be accessed. When a program accesses a memory for the first time, the address information of the memory block is not stored in the cache unit, therefore the read result of the address information reading module 30 is empty. In such a case, whether the current memory access is valid (such as whether the array overflows or overruns) is determined by the second validity determining module 50 (such as the instrumentation-based memory checking tool). When the second validity determining module 50 determines that the current memory access is valid, the address information of the memory block is filled into the graded cache unit by the address information writing module 60. When the access is invalid, the checking information showing that the access is invalid is output. In the second or subsequent access of the program, the validity of the current memory access can be checked rapidly based on the range of the current memory access according to the address information of the memory block read from the graded cache units.

In an embodiment of the present disclosure, the cache index calculating module 20 is arranged to:

select a cache grade according to the size of the memory block;

calculate a corresponding grade position index of the memory block in the current cache grade according to the address information of the memory block to be checked; and add the grade position index and an initial position of the current cache grade so as to obtain the total cache position index.

In an embodiment of the present disclosure, the first validity determining module 40 is arranged to:

when an actual access range is in a range defined by the address information, determine that the current memory access is valid, and continue running the checked program;

when the actual access range exceeds the range defined by the address information, not determine that the current memory access is valid, and trigger the second validity determining module 50 to work.

As previously mentioned, the address information of the memory block refers to the initial address and the ending address of the memory block to be accessed, and the initial address and the ending address define the access range. When an actual access range is in a range defined by the address information, the access does not cause overrun, then the first validity determining module 40 determines that the current memory access is valid, and the instrumentation-based memory checking tool is not needed for checking, the checked program continues. When the actual access range exceeds the range defined by the address information, the access causes overrun, the access is invalid, the instrumentation-based memory checking tool is needed for checking the validity of the current memory access, and the second validity determining module 50 is triggered by the first validity determining module 40 to work.

Figure 4:
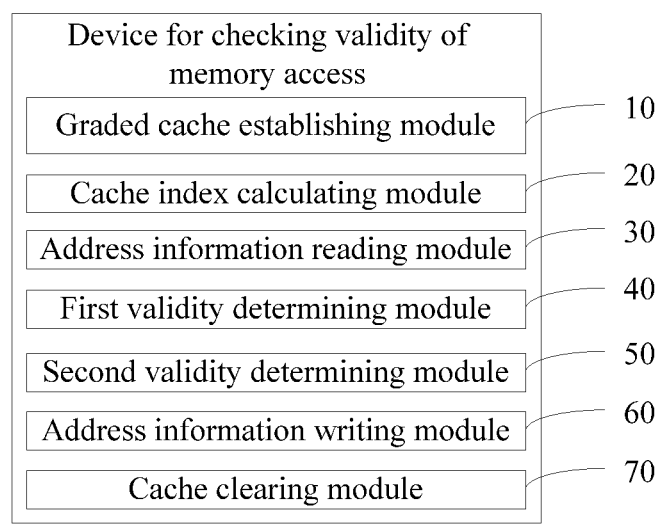
FIG. 4 shows a structural diagram of a device for checking validity of memory access in another exemplary embodiment of the present disclosure.

As shown in FIG. 4, in an embodiment of the present disclosure, the device may further include:

a cache clearing module 70, arranged to clear memory information in the graded cache unit when the memory block is freed. For example, when the memory block is freed, the cache clearing module 90 sets an initial position of the memory information in the corresponding cache unit to be a maximum address value, and sets the ending address to be 0.

The above is only the exemplary embodiments of the present disclosure and not intended to limit the scope of protection of the present disclosure, and any equivalent structures or equivalent process transformations based on the embodiments and drawings of the present disclosure, used directly or indirectly in other related art shall fall within the scope of protection of the present disclosure.

INDUSTRIAL APPLICABILITY

As mentioned above, the beneficial effect of the method and device for checking validity of memory access in embodiments of the present disclosure is as the follows: the validity of memory access can be rapidly checked, thereby avoiding the problem, existed in the memory access validity checking technology of the related art, of checking the validity through the instrumentation-based memory checking tool every time when accessing a memory, improving the efficiency of checking the validity of memory access and improving the software performance.

What is claimed is:

1. A method for checking validity of memory access, comprising:

establishing a cache and performing initialization;

calculating a total cache position index according to a size and address of a memory block to be checked;

when a program performs memory access, addressing a graded cache unit according to the total cache position index, and determining whether address information of the memory block is able to be read from the graded cache unit;

when the address information of the memory block is able to be read from the graded cache unit, determining, according to a range of the current memory access, whether an instrumentation-based memory checking tool is needed for checking the validity of the current memory access;

when the address information of the memory block is not able to be read from the graded cache unit, checking the validity of the current memory access by an instrumentation-based memory checking tool, and filling the address information of the memory block into the graded cache unit when the current memory access is determined to be valid.

2. The method for checking validity of memory access as claimed in claim 1, wherein calculating the total cache position index according to the size and address of the memory block to be checked comprises:

selecting a cache grade according to the size the memory block;

calculating a corresponding grade position index of the memory block in the current cache grade according to the address information of the memory block to be checked; and adding the grade position index and an initial position of the current cache grade so as to obtain the total cache position index.

3. The method for checking validity of memory access as claimed in claim 2, wherein determining, according to the range of the current memory access, whether the instrumentation-based memory checking tool is needed for checking the validity of the current memory access comprises:

when an actual access range is in a range defined by the address information, determining that the current memory access is valid, and continuing running the checked program;

when the actual access range exceeds the range defined by the address information, not determining that the current memory access is valid, and checking the validity of the current memory access by the instrumentation-based memory checking tool.

4. The method for checking validity of memory access as claimed in claim 3, further comprising:

clearing memory information in the graded cache unit when the memory block is freed.

5. The method for checking validity of memory access as claimed in claim 2, wherein calculating the corresponding grade position index of the memory block in the current cache grade according to the address information of the memory block to be checked comprises:

right-shifting the address of the memory block to be checked by a number of bits and then performing a logical AND operation on the right-shifting result and 0XFFFF to obtain the grade position index.

6. The method for checking validity of memory access as claimed in claim 5, wherein the number of right-shifted bits is related to the cache grade, and the numbers of right-shifted bits corresponding to the first grade to the seventh grade are respectively 3, 7, 10, 13, 16, 20, and 20.

7. The method for checking validity of memory access as claimed in claim 1, wherein determining, according to the range of the current memory access, whether the instrumentation-based memory checking tool is needed for checking the validity of the current memory access comprises:
when an actual access range is in a range defined by the address information, determining that the current memory access is valid, and continuing running the checked program;
when the actual access range exceeds the range defined by the address information, not determining that the current memory access is valid, and checking the validity of the current memory access by the instrumentation-based memory checking tool.

8. The method for checking validity of memory access as claimed in claim 7, further comprising:
clearing memory information in the graded cache unit when the memory block is freed.

9. The method for checking validity of memory access as claimed in claim 1, wherein establishing the cache and performing initialization comprises:
according to statistical data of memory use conditions of common software, establishing grades of cache, each grade caching 65536 units, wherein the 7 grades of cache correspond to memory blocks with the size of 1-8, 9-128, 129-1K, 1K-8K, 8K-64K, 64K-1M and above 1M respectively.

10. The method for checking validity of memory access as claimed in claim 1, wherein the address information of the memory block refers to an initial address and an ending address of the memory block to be accessed.

11. A device for checking validity of memory access, comprising a hardware processor, configured to perform programming components stored in a memory, wherein the hardware processor comprises:
a graded cache establishing module, arranged to establish a cache and perform initialization;
a cache index calculating module, arranged to calculate a total cache position index according to a size and address of a memory block to be checked;
an address information reading module, arranged to, when a program performs memory access, address a graded cache unit according to the total cache position index, and determine whether address information of the memory block is able to be read from the graded cache unit;
a first validity determining module, arranged to determine, according to a range of the current memory access, whether an instrumentation-based memory checking tool is needed for checking the validity of the current memory access, when the address information of the memory block is able to be read from the graded cache unit;
a second validity determining module, arranged to check the validity of the current memory access by an instrumentation-based memory checking tool, when the address information of the memory block is unable to be read from the graded cache unit; and
an address information writing module, arranged to fill the address information of the memory block into the graded cache unit, when the current memory access is determined to be valid by the instrumentation-based memory checking tool.

12. The device for checking validity of memory access as claimed in claim 11, wherein the cache index calculating module is arranged to:
select a cache grade according to the size of the memory block;
calculate a corresponding grade position index of the memory block in the current cache grade according to the address information of the memory block to be checked; and
add the grade position index and an initial position of the current cache grade so as to obtain the total cache position index.

13. The device for checking validity of memory access as claimed in claim 12, wherein the first validity determining module is arranged to:
when an actual access range is in a range defined by the address information, determine that the current memory access is valid, and continue running the checked program;
when the actual access range exceeds the range defined by the address information, not determine that the current memory access is valid, and trigger the second validity determining module to work.

14. The device for checking validity of memory access as claimed in claim 13, further comprising:
a cache clearing module, arranged to clear memory information in the graded cache unit when the memory block is freed.

15. The device for checking validity of memory access as claimed in claim 12, wherein the cache index calculating module is arranged to calculate the corresponding grade position index of the memory block in the current cache grade according to the address information of the memory block to be checked in the following manner:
right-shifting the address of the memory to be checked by a number of bits and then performing a logical AND operation on the right-shifting result and 0XFFFF to obtain the grade position index.

16. The device for checking validity of memory access as claimed in claim 15, wherein the number of right-shifted bits is related to the cache grade, and the numbers of right-shifted bits corresponding to the first grade to the seventh grade are respectively 3, 7, 10, 13, 16, 20, and 20.

17. The device for checking validity of memory access as claimed in claim 11, wherein the first validity determining module is arranged to:
when an actual access range is in a range defined by the address information, determine that the current memory access is valid, and continue running the checked program;
when the actual access range exceeds the range defined by the address information, not determine that the current memory access is valid, and trigger the second validity determining module to work.

18. The device for checking validity of memory access as claimed in claim 17, further comprising:
a cache clearing module, arranged to clear memory information in the graded cache unit when the memory block is freed.

19. The device for checking validity of memory access as claimed in claim 11, wherein the graded cache establishing module is arranged to:
according to statistical data of memory use conditions of common software, establish 7 grades of cache, each grade caching 65536 units, wherein the 7 grades of cache correspond to memory blocks with the size of 1-8, 9-128, 129-1K, 1K-8K, 8K-64K, 64K-1M and above 1M respectively.

20. The device for checking validity of memory access as claimed in claim 11, wherein the address information of the memory block refers to an initial address and an ending address of the memory block to be accessed.

* * * * *